Jan. 31, 1961 P. ADAMS 2,970,069
MAGNETIC RECORDING COMPOSITION AND DEVICE
Filed July 17, 1957
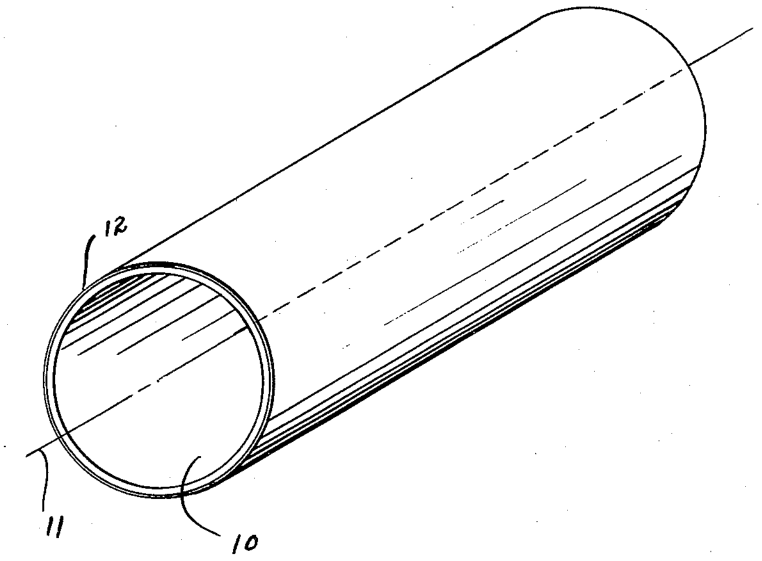
INVENTOR.
PIERREPONT ADAMS
BY
Emery, Whittemore, Sandoe & Dix
ATTORNEY United States Patent Office 2,970,069

Patented Jan. 31, 1961

2,970,069

MAGNETIC RECORDING COMPOSITION AND DEVICE

Pierrepont Adams, Darien, Conn. (671 Hope St., Springdale, Conn.)

Filed July 17, 1957, Ser. No. 672,489

5 Claims. (Cl. 117—132)

This invention relates to magnetic recording media and in particular to a thermosetting plastic pigmented with a ferro magnetic material for producing recording surfaces which can be finished to high degrees of dimensional precision.

Magnetic recording drums or cylinders are generally formed from aluminum machined to a high degree of accuracy to be concentric with the longitudinal axis and are thereafter coated with a magnetic material.

Since the cylinders carry a magnetic recording medium coated thereon, it is essential that the coating be of uniform thickness to a high degree of precision so that concentricity of the cylinder surface is not destroyed. A play-back head must be spaced from the surface in accordance with the highest point of the surface related to the axis of the cylinder. By providing a uniform surface on a drum or disk as a base, the smooth surface and the closely controlled magnetic coating gives improved electrical performance of the recording device.

Magnetic recording cylinders, drums or disks, being rigid, have certain properties that are different from magnetic recording tape and film, which are relatively soft and flexible. The recording and play-back heads cannot be in absolute contact with a drum for the unyielding nature of the base would cause excessive wear and damage of the coating and heads. However, it is desirable to have these heads as close as possible to the drum or disk in order to impress and receive useful and reporducible signals, in as short wave length, or high magnetic packing density as practicable. To accomplish this end the drum and its magnetic coating should be as nearly concentric as possible. It is possible to prepare aluminum drums concentric to a fine degree of precision by either machining or grinding techniques but the conventional magnetic coatings on the drums leave much to be desired in uniformity of thickness.

Thus, the fundamental object of this invention is to provide a composition of a nature such that it is suitable for preparing a magnetic surface on a rigid base which can be finished to a very high degree of precision for use in this type of recording and play-back apparatus.

Other objects and advantages of the invention will in part be obvious and in part appear hereinafter.

I have found that a uniform magnetic coating which will give improved electrical performance may be obtained by applying to a smooth machined drum a substantial excess of a magnetic coating material based on a plastic of thermosetting character so compounded to produce a readily machinable coating, and then, after curing, grinding the coating, using any conventional wet grinding or turning technique, down to the desired thickness of coating. In this manner the drums formed to an accurate cylindrical dimension can have thin coatings applied thereto which are also accurately concentric, the said coatings being of a hard character and permitting an improved electrical performance of the apparatus, because with the high degree of accuracy and concentricity of the record surface the play-back head may be placed closer to the active magnetic surface. That is, where the concentricity can be within a high degree of precision, the spacing of the heads may be reduced to a minimum.

In the accompanying drawing the single figure illustrates in diagrammatic form the preparation of a cylindrical drum.

Conventional dispersions of magnetic iron oxide currently used in the preparation of tapes have been designed for application to very flexible bases and, for this reason, are made inherently soft and flexible to match the base. When these materials carrying the magnetic oxide are coated on drums, disks or other hard surfaces, it is not possible to grind them or finish them down to a uniform thickness, because they soften and flow under the pressure and heat caused by the grinding, or other machining techniques. Also, thermoplastic materials of this soft character cling to grinding wheels or cutting tools, thereby necessitating frequent cleaning of the wheel or the cutting tool. When a particle embeds itself or clings to the surface of the grinding wheel or cutting tool, it will score and produce an uneven surface finish on each succeeding rotation of the drum during the machining process. This characteristic is especially bad on normal coatings used for conventional sound recording tapes, because they typically have relatively low thermal softening points.

By adopting certain hard thermostatting resins as the media for dispersions of the iron oxide for preparation of the magnetic coating, I have found that the preparation of accurately dimensioned recording drums can be carried out without material difficulty. Accordingly, I prepare magnetic recording media by dispersing a magnetic pigment such as gamma ferric oxide in a hard resin or combination of resins which serve properly to disperse the iron oxide and to bind it to the base following application. For the purpose of applying the magnetic iron oxide to the recording surface, I have found most suitable the thermosetting resins, which include alkylated urea-formaldehyde, alkylated melamine-formaldehyde, and mixtures thereof. Also, those resins blended with glycerylphthalate admixtures or any other compatible resin which will toughen or plasticize the urea or melamine resin may be used at this stage.

These resins are usually prepared from urea or melamine or mixtures of these compounds. However, they may be prepared from alkyl or aryl substituted ureas or melamines. They may also be prepared from guanamines such as benzoguanamine. The glyceryl phthalate resins are generally modified with small amounts of drying or non-drying fatty acids and are known as short oil modified alkyd resins. The use of glyceryl phthalate resins is not specifically required for this invention. Any other compatible resins that will properly plasticize and toughen the urea or melamine resin would also be suitable. This resin carrier for the magnetic iron oxide must also be adhesive so that it will stick to the drum or disk. Hence, it is good practice to blend urea and melamine surface coating resins with glyceryl phthalate resins and the mixtures form good coating materials.

The magnetic iron oxide may be dispersed in either the urea, melamine, or glyceryl phthalate resin or any combination of these on a paint mill or in a ball mill. Generally the pigment is dispersed in the glyceryl phthalate resin and then the urea or melamine resin is added.

The resin-pigment mixture may be coated on the recording drum or disk by any suitable method and it is then heated to harden the coating. The time of heating will vary with the size of the article but a period of about 15 to 60 minutes at 100°–175° C. will be suitable. The time of the cure should be measured after the article has reached the curing temperature and the shorter cure time would be used at the higher temperature. After curing and cooling the drum or disk it is then ground or cut to the desired thickness by machine shop techniques in a grinding machine or lathe.

The following examples will illustrate the technique.

*Example I*

To 70 parts by weight of gamma ferric oxide were added 60 parts by weight xylene and 30 parts by weight of a 50 percent solution of glyceryl phthalate resin modified with dehydrated castor oil fatty acids (e.g., Rezyl 330–5, manufactured by American Cyanamid Company). This mixture was ground in a ball mill for 15 to 36 hours to produce a good dispersion. There was then added 30 parts by weight of a 50 percent solution of a butylated urea-formaldehyde resin (e.g., Beetle Resin 227–8 manufactured by American Cyanamid Company). After thorough mixing, the dispersion was removed from the ball mill and filtered. The dispersion was thinned with normal butanol to spray viscosity before application.

The aluminum drum to be coated was degreased and then placed in 5 percent aqueous sodium hydroxide solution at room temperature for five minutes. Following this preliminary etching, it was washed in running water and then placed in water heated to 90° to 100° C. for ten minutes. The drum was then placed in a machine so it could be turned on its axis. After the drum was cool it was sprayed with the magnetic iron oxide dispersion while being turned. When more than the desired thickness of coat had been applied the solvents were allowed to evaporate while continuing to turn the drum for 15 minutes. Infra red lamps were then placed around the drum and while continuing to turn it about its axis the coating was baked for one hour. The result was a hard coating firmly adhering to the aluminum drum. When the coated drum was cool it was ground to the desired thickness, 0.002 inch, using standard wet grinding technique with a 400 grit lapping wheel. The result was a highly polished coating of uniform thickness and concentricity.

The magnetic performance of the drum was tested at 200 pulses per inch and found to be very satisfactory. The head to record medium space was 0.0005 inch.

*Example II*

The urea-formaldehyde resin of the previous example was replaced by a melamine-formaldehyde resin (Uformite MM–55, manufactured by Rohm and Haas Company, with equally good results.

Xylene is a useful solvent, because it is volatile, without being inconveniently so. Equally useful at the pigment dispersal stage are other hydrocarbon solvents such as toluene or mixtures of toluene or xylene. A boiling point of 100° C. to 150° C. is desirable.

As the final thinner for reducing to spray consistency, butanol, Cellosolve compounds, or any solvent useful as a lacquer thinner and having a boiling point approximating that of butanol may be used.

Alkylated urea formaldehyde resins and alkylated melamine formaldehyde resins generally may be used. Those having high molecular weight and high degrees of hardness after curing are preferred. Benzoguanamine-formaldehyde resins may also be used in compositions made in accordance with Examples I and II. All of these resins are preferably alkylated with alcohols having 3–8 carbon atoms. Amounts to be used correspond to those stated for urea- and melamine-formaldehyde.

These urea, melamine, or guanamine resins are prepared from one of these nitrogen containing compounds or a mixture of them by reacting them with formaldehyde and an alcohol, generally normal butanol, under slightly acidic conditions. The molar ratio of formaldehyde to urea will be 1.5–2.5 to 1, the molar ratio of formaldehyde to melamine will be 3–6 to 1, and the molar ratio of formaldehyde to benzoguanamine will be 2–4 to 1. The amount of alcohol used is always in excess. This allows part of the alcohol to combine chemically to confer organic solubility and the unreacted portion of the alcohol remains as a solvent for the resin.

In Examples I and II the weight ratio of glyceryl phthalate to the urea-benzoguanamine or melamine-formaldehyde resin was 1:1 on a weight basis, which is a preferred level. Actually, I have found weight ratios of glyceryl phthalate to the formaldehyde resin in the range 1:1.5 to 6:1 useful.

Within this range I have found the ratio of glyceryl phthalate to urea resin preferably about 1:1.5 to 4:1; for the benzoguanamine and melamine the ratio is about 1:1 to 6:1. That is, in formulating a magnetic recording composition in accordance with this invention, the glyceryl phthalate is treated as a modifier of the urea-, benzoguanamine-, or melamine-resin, or mixture and any weight ratio of components within the range defined will give very useful results, with coatings of optimum hardness properties being prepared within the more restricted ranges.

Referring to the drawing, 10 represents a cylinder suitable for use as a base for application of a magnetic recording surface. The cylinder is accurately made concentric around its longitudinal axis 11, and commonly the size of the cylinder will be from 1 to 36 inches in diameter in which the radius is turned to a tolerance of plus or minus 0.0001 inch for cylinders up to 8 inches in diameter. The length of the cylinder will vary but in general will be about 10 inches. Coating 12 which is applied thereto in accordance with this invention, is generally of a thickness 0.002 inch plus or minus 0.0001 inch.

In the utilization of drums or disks carrying coatings made in accordance with this invention, the closer the recording or play-back head may be brought to the surface, the better will be the electrical performance. With a drum made in accordance with Examples I, II, et seq. and having the coating made to 0.002 inch with the tolerance indicated, it was found that recording and play-back could be conveniently carried out with a median head spacing of 0.005 inch. Thus, the preferred tolerance of under 5 percent in the thickness of the coating makes possible a very close placement of a recording or play-back head, with consequent advantages.

The amount of pigment in the resin is, of course, related to the end use as a magnetic recording medium. Proportions of gamma ferric oxide to any of the resin coating bases may be varied, in parts by weight from 1:1 to 4:1.

Similarly the curing temperature and time are related to the mass of the drum. Actually, since the drums are precision articles, it is desirable to treat the coatings as such and, accordingly, the coating is preferably cured by use of infra red radiation with lamps placed to direct heat at the rotating cylinder.

The curing temperature may vary between 100° C. and 175° C. with the time of cure varying from 15 minutes to two hours. The longer time will be used at the lower temperatures and the time should be measured after the article reaches the desired temperature.

To obtain adhesion of the coating to the drum or disk, it is not absolutely essential to treat the drum or disk with sodium hydroxide and hot water. A primer coat of synthetic resins and inert pigments may also be used. In fact, this latter method may be preferable, for then the magnetic coating is isolated magnetically from the metallic base.

Though the invention has been described in terms of only a single embodiment, it is to be understood that variations thereof may be practiced without departing from its spirit or scope.

What is claimed is:

1. A magnetic recording surface consisting of a metal base and a uniform, hard magnetic recording medium adhered thereto, said medium consisting essentially of a substantially uniform layer of a thermosetting resin selected from the group consisting of alkylated urea formaldehyde resins, alkylated melamine formaldehyde resins, alkylated benzoguanamine formaldehyde resins and mixtures thereof, said alkyl groups containing 3 to 8 carbon atoms, said thermosetting resin being blended with a glyceryl phthalate resin, said entire composition containing uniformly dispersed therein a magnetic iron oxide, said coating being of a uniform thickness within plus or minus 5 percent of nominal thickness which is from about 0.001 inch to about 0.005 inch.

2. A magnetic recording surface in accordance with claim 1 in which the resin is a blend of alkylated urea-formaldehyde and glyceryl phthalate resins in a weight ratio from 1.5:1 to 1:4.

3. A magnetic recording surface in accordance with claim 2 in which the ratio of resins is about 1:1.

4. A magnetic recording surface in accordance with claim 1 in which the resin is a blend of glyceryl phthalate and alkylated melamine-formaldehyde resins in a weight ratio of about 1:1 to 6:1.

5. A magnetic recording surface in accordance with claim 1 in which the resin is a blend of glyceryl phthalate and alkylated benzoguanamine-formaldehyde resins in a weight ratio of about 1:1 to 6:1.

References Cited in the file of this patent

UNITED STATES PATENTS

| | | |
|---|---|---|
| 2,223,327 | Light et al. | Nov. 26, 1940 |
| 2,465,284 | Schmidt et al. | Mar. 22, 1949 |
| 2,508,705 | Beller et al. | May 23, 1950 |
| 2,594,893 | Faus | Apr. 29, 1952 |
| 2,670,341 | Joffe | Feb. 23, 1954 |
| 2,689,228 | Thomas | Sept. 14, 1954 |
| 2,695,895 | Barnard et al. | Nov. 30, 1954 |